(12) United States Patent
Rose et al.

(10) Patent No.: US 8,248,922 B2
(45) Date of Patent: *Aug. 21, 2012

(54) SYSTEM AND METHOD FOR AVOIDING DUPLICATION OF MAC ADDRESSES IN A STACK

(75) Inventors: Laurence Rose, Oak Park, CA (US); Manish Gupta, Woodland Hills, CA (US)

(73) Assignee: Alcatel Lucent, Paris (FR)

( * ) Notice: Subject to any disclaimer, the term of this patent is extended or adjusted under 35 U.S.C. 154(b) by 407 days.

This patent is subject to a terminal disclaimer.

(21) Appl. No.: 11/877,388

(22) Filed: Oct. 23, 2007
(Under 37 CFR 1.47)

(65) Prior Publication Data
US 2008/0205418 A1    Aug. 28, 2008

Related U.S. Application Data

(63) Continuation-in-part of application No. 11/028,346, filed on Dec. 30, 2004.

(60) Provisional application No. 60/863,892, filed on Nov. 1, 2006.

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ...................................................... 370/222
(58) Field of Classification Search .................. 370/216, 370/217, 218, 220, 222
See application file for complete search history.

(56) References Cited

U.S. PATENT DOCUMENTS

| | | | |
|---|---|---|---|
| 6,928,049 B2 * | 8/2005 | Shabtay et al. | 370/223 |
| 2003/0169748 A1 * | 9/2003 | Weyman et al. | 370/401 |
| 2006/0146697 A1 * | 7/2006 | Magret et al. | 370/219 |
| 2006/0244624 A1 * | 11/2006 | Wang et al. | 340/815.67 |
| 2007/0253329 A1 * | 11/2007 | Rooholamini et al. | 370/220 |

\* cited by examiner

*Primary Examiner* — Huy D Vu
*Assistant Examiner* — Adnan Baig
(74) *Attorney, Agent, or Firm* — Garlick & Markison; Jessica W. Smith

(57) ABSTRACT

A system and method of operating a set of stack elements that are stackable and connected to form a ring. In one embodiment, the stack Media Access Control (MAC) address is stored in each stack element of the ring; and responsive to an assessment that communication with a primary stack element is lost, a determination is made whether to replace the first MAC address with a second MAC address or to retain the first MAC address in each stack element remaining of the set of stack elements.

20 Claims, 9 Drawing Sheets

SYSTEM AND METHOD FOR AVOIDING DUPLICATION OF MAC ADDRESSES IN A STACK

PRIORITY UNDER 35 U.S.C. §119(E) & 37 C.F.R. §1.78

This non-provisional patent application claims priority based upon the following prior U.S. provisional patent application: "Some Architectural Designs to Support 'Retaining Usage of the Primary Router MAC Address Throughout Multiple Failures of the Primary Element of a Stack of Switches/Routers'", Application No. 60/863,892; filed Nov. 1, 2006, in the name(s) of: Laurence Rose and Manish Gupta, which is hereby incorporated by reference. Furthermore, this non-provisional patent application is a continuation-in-part application of the following U.S. non-provisional patent application: "Retention Of A Stack Address During Primary Master Failover", application Ser. No. 11/028,346; filed Dec. 30, 2004, in the name(s) of: Laurence Rose and Vincent Magret, which is hereby incorporated by reference.

FIELD

The present disclosure generally relates to the management of stackable elements, such as switches or routers, in a data communication network. In particular, the present disclosure relates to a scheme for avoiding the duplication of MAC addresses when retaining usage of a MAC address in a stack.

BACKGROUND

Stackable elements, as used in this application, are switches or routers that may function in a stand-alone mode and may also function within a stack. These stackable elements are coupled into a single logical unit called a stack and are operatively interconnected via a pair of designated stack ports present on each of the stackable elements. The system of stackable elements is generally coupled in series and the topology of the system generally characterized by a closed loop called a ring or an open strand of elements referred to herein as a chain. Each of the stackable elements may be adapted to perform switching between its own data ports as well as the data ports of other stackable elements by transmitting packets via the stack ports that facilitate the efficient transmission and switching of these packets to the appropriate stack element port.

Each element in a stack is capable of election as the primary master or the secondary master, also referred to here as the primary element and the secondary element. The primary master performs the primary stack management functions, which may include maintaining and updating one or more configuration files, routing information and related database structures, and other stack information. The secondary master acts as a back-up to the primary master. One primary master element and one secondary master element are generally elected in a stack system. This election mechanism may be governed by various election criteria as known to those of ordinary skill in the art. Such election criteria, for example, may be governed by the switchable element having the lowest media access control (MAC) address or having the longest uptime or having the lowest stack identifier. User priority may also govern the primary and secondary master election.

Various pieces of information are needed to effectively run and communicate within a system of stackable elements, such as integrated stack switches. The system of stackable elements is generally, for example, identified with one Internet Protocol (IP) address and one stack address. This makes the system of stackable elements appear as one logical unit, particularly, to external devices communicating with such system.

Each stackable element is typically delivered to a customer with a unique local MAC address. This address is a globally-assigned, organizationally-unique identifier that is assigned by the manufacturer. This MAC address is generally stored in persistent memory. In traditional stackable element systems, the stack address mirrors the MAC address of the currently running primary master. Thus, when a primary master fails and a secondary master starts functioning as the primary master, the stack address for the system of stackable elements is also accordingly changed to reflect the MAC address of the now running primary master.

These changes upon a failover may impact not only the system of stackable elements but also surrounding devices that communicate with this stack. One example is the impact to Address Resolution Protocol (ARP) tables and other Layer 3 tables. For example, assume that the system of stackable elements, Stack A, is known to surrounding devices with stack address, M1. When a failover occurs, the secondary starts functioning as the new primary master and the stack address is also accordingly changed, for example, to M2, i.e., the new primary master's MAC address. Stack A advertises its new stack address—M2. Neighboring or surrounding nodes which have already associated Stack A with stack address M1, now have to changed their ARP tables to associate Stack A with the new stack address M2. This change in stack address also entails updating and replacing all routes using the previous stack address of M1 as the next hop, with the new stack address M2.

Another aspect that may be impacted is link aggregation, which may be effectuated in accordance with known standards. Link aggregation or trunking is a method of combining physical network links into a single logical link to increase bandwidth. In some prior art embodiments, changing the stack address results in the aggregates or trunks being recomputed considering that the stack address is used in computing keys necessary to provide link aggregation. A change in the stack address thus generates a new set of keys using the new address.

Another aspect that may be impacted is the recalculation of the spanning tree in accordance with known spanning tree protocols. If the stack address is changed due to the election of a new primary master, a new spanning tree may have to be recalculated to account for this change. This is particularly burdensome when the new elected primary master becomes the new root bridge. The root bridge uses the MAC address as one of its parameters.

Further, changes in a stack address may also have a direct impact to the network and to the performance of the system of stackable elements. The change of stack address can give rise to higher latency due to relearning of the new stack address or re-computation of new spanning tree or trunks. This may lead to situations where links are temporarily down. Such impact is particularly burdensome when multiple primary master to secondary master failovers occur within the stack.

SUMMARY

In one embodiment, a method is disclosed for operating a set of stack elements that are stackable and that are connected to form a ring. A first Media Access Control (MAC) address is stored in each stack element of the ring. Responsive to an assessment that communication with a primary stack element is lost, a determination is made whether to replace the first MAC address with a second MAC address or to retain the first MAC address in each stack element remaining of the set of stack elements.

In another embodiment, a computer-readable medium operable with a processing entity for managing a set of stack elements that are stackable and that are connected to form a ring is disclosed. The medium includes instructions for storing a first MAC address in each stack element of the ring and further includes, responsive to an assessment that communication with a primary stack element is lost, instructions for determining whether to replace the first MAC address with a second MAC address or to retain the first MAC address in each stack element remaining of the set of stack elements.

In another embodiment, a set of stack elements connected to function as a single logical element, e.g., a stacked switch system, is disclosed. Each element of the set includes means for storing a first MAC address for the logical element and also includes means, responsive to an assessment that communication with a primary stack element is lost, for determining whether to replace the first MAC address with a second MAC address or to retain the first MAC address.

BRIEF DESCRIPTION OF THE DRAWINGS

A more complete understanding of the present disclosure may be had by reference to the following Detailed Description when taken in conjunction with the accompanying drawings wherein.

DETAILED DESCRIPTION OF THE DRAWINGS

Figure 1:
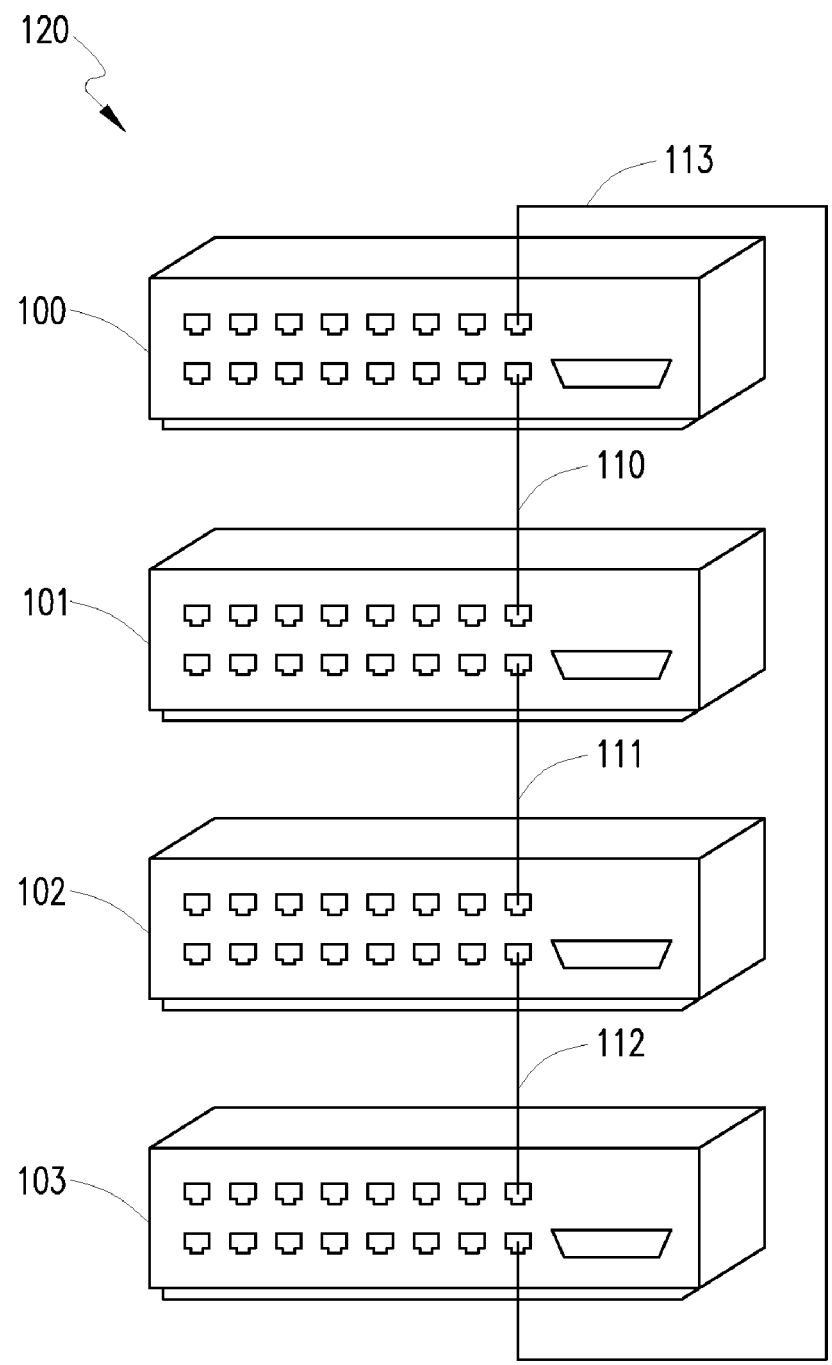
FIG. 1 is a functional block diagram of a system of stackable elements, such as an integrated stack switch (ISS) in accordance with one embodiment.

Embodiments of the present disclosure will now be described hereinbelow with reference to various examples. Like reference numerals are used throughout the description and several views of the drawings to indicate like or corresponding parts, wherein the various elements are not necessarily drawn to scale.

Illustrated in FIG. 1 is a functional block diagram of a system of stackable elements, such as an integrated stack switch (ISS) 120 in a data communications network. The ISS 120 includes a plurality of stackable elements 100-103 operatively linked in a series to form a ring topology, for example, by means of stack links 110-113, that may be effectuated using twisted-pair or fiber optic cables, wireless means, and the like, for instance. The switching devices 100-103 are preferably stackable switches operatively coupled to one another through one or more special-purpose ports referred to by those skilled in the art as stack ports. The plurality of stackable elements 100-103 are adapted to transmit packetized data between the other elements of the ISS 120 as well as one or more end stations and other addressable entities operatively coupled to the ISS via one or more local area networks (LANs), wide area networks (WANs), metropolitan area networks (MANs), or the Internet, for example.

In one embodiment, the stackable elements 100-103 are multi-layer switches adapted to perform switching and routing operations with protocol data units (PDUs), preferably frames and packets, at Layer 2 (Data Link Layer) and Layer 3 (Network Layer) as defined by the Open Systems Interconnect (OSI) reference model, although they may also perform Layers 4-7 switching operations. Each of the stackable elements 100-103 is generally capable of functioning as a standalone network bridge, switch, or router. Together, the stackable elements 100-103 may cooperate to emulate a logically single switching device. The ISS system 120 preferably has a single stack address used by all the stackable elements and a single Internet Protocol (IP) address.

In conjunction with a stack manager according to embodiment, the ISS 120 of the present patent disclosure is operable to minimize and control the updates of tables, particularly Layers 2-3 tables, of end stations or other addressable entities operatively coupled to the ISS 120 via a network. The ISS of the present disclosure also minimizes and controls the computational updates needed by certain protocols, such as link aggregation and spanning tree protocol when a switch management failover occurs.

When communication is lost between a primary stack element, e.g. 100, and the other stack elements, such as 101-103, the remaining stack elements elect a new primary and continue to function. If these elements follow the original initialization procedure, the remaining elements of ISS 120 will then operate under the MAC address of their new primary element. It is disclosed herein that the remaining stack elements of ISS 120 can retain the MAC address of the original primary stack element and thus avoid the overhead associated with changing the MAC address of ISS 120. However, loss of communication with the primary stack element can result from different types of failures, not all of which should be managed in the same manner. For example, if stackable elements 101-103 can no longer communicate with stackable element 100, element 100 may have crashed; this example is preferably managed by retaining the MAC address of stack element 100, so that disruption to the environment is minimized. However, it is also possible that connections 110 and 113 were removed, allowing stack element 100 to continue to operate as a standalone element, while remaining stack elements 101-103 continue to operate as a stack. In this example, element 100 is continuing to use its own MAC address, so retaining the MAC address in stack elements 101-103 would cause a duplicate address. Therefore, it would be desirable that stack elements 101-103 preferably assume the MAC address of their new primary stack element to avoid such address duplication.

Upon an assessment that communication with a primary element has been lost, the decision whether or not to retain the stack's MAC address may be determined by the system logic executing on the remaining elements as well be set forth in detail hereinbelow. The stack manager may have no direct means of detecting whether the loss of communication with the primary element is caused by a crash of the primary element or by the loss of the connections. Therefore, the decision, to retain or replace the MAC address, may be mediated via using a timer mechanism. If the loss of communication with the primary element occurs a "short time" after the ring broke, as seen by the stack manager, the two events are probably caused by a single failure, i.e., a crash of the primary element. Because the ring was established beforehand, the stack MAC is retained. If the loss of communication with the primary element occurs a "long" time after the ring was broken, the loss is probably caused by at least two failures, the first failure breaking the ring and the second failure causing the loss of communication with the primary element. This means that the original ring may have been broken into two or more functional stack segments. Therefore, to avoid duplication of the stack MAC address(es), the embodiments set forth herein provide that a new MAC address is established as may be necessary.

Figure 2:
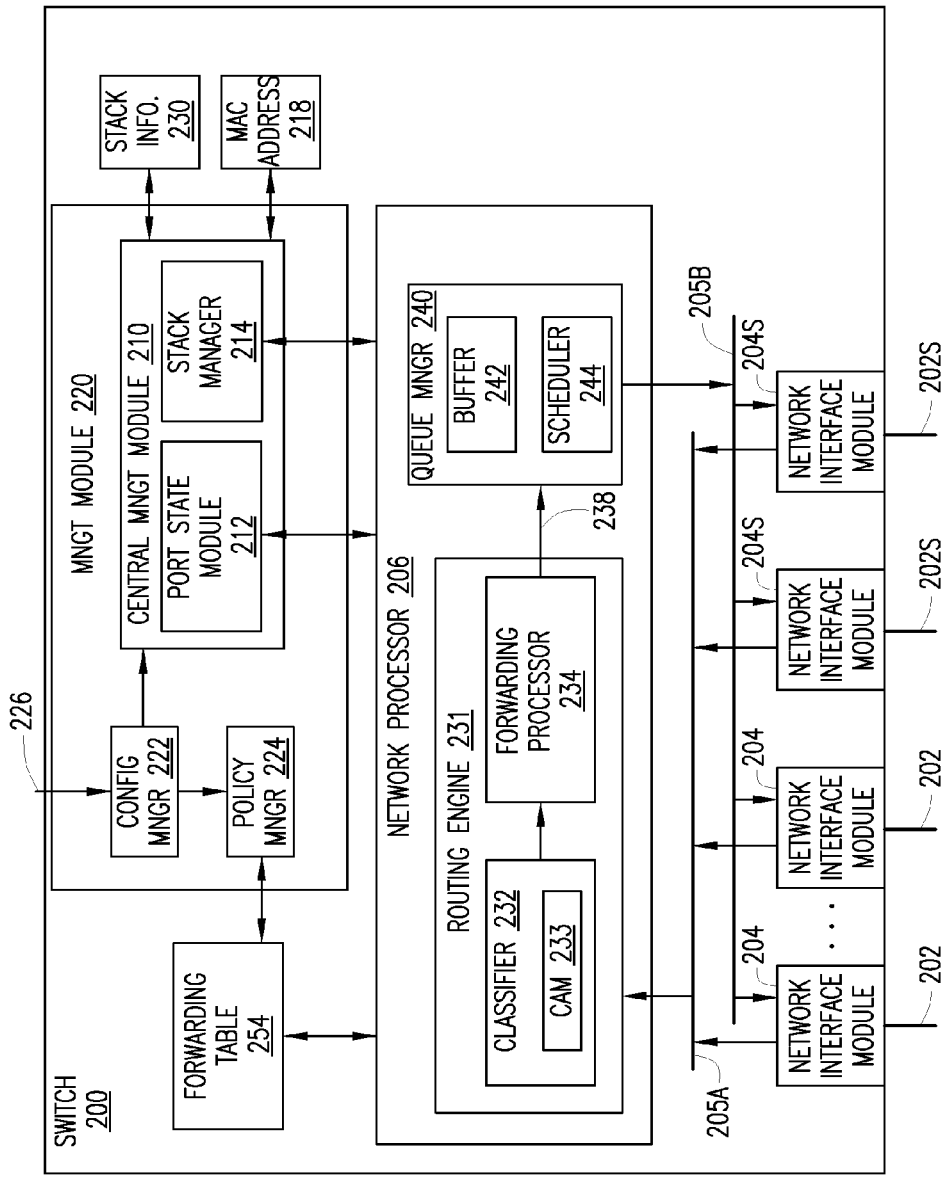
FIG. 2 is a functional block diagram of a stack element employed in the ISS system in accordance with one embodiment.

Illustrated in FIG. 2 is a functional block diagram of a stackable element, such as a stack switch, employed in the ISS 120 in accordance with one embodiment. The stackable element 200 comprises one or more network interface modules (NIMs) 204, one or more switching controller/processor modules 206, and a management module 220, which cooperate to receive ingress data traffic and transmit egress data traffic via each of the external ports 202. For purposes of this embodiment, data flowing into the stackable element 200 from another network node is referred to herein as ingress data, which comprises ingress protocol data units. In contrast, data propagating internally to a port 202 for transmission to another network node is referred to as egress data, which comprises egress PDUs. Each of the plurality of the ports 202 is preferably a duplex port adapted to receive ingress data and transmit egress data.

The NIMs 204, 204S preferably include one or more physical layer interfaces and data link layer interfaces adapted to exchange PDUs, e.g., Ethernet frames and IP packets, via network communications links (not shown). Among the plurality of ports 202 are two stack ports 202S for incorporating the particular stack stackable element 200 into the ISS 120. The stack port NIMs 204S associated with the two stack ports 202S are, for example, standard Ethernet ports and are adapted to exchange PDUs conventional data traffic with various compatible nodes as well as inter-stack communications to other stackable elements depending on the stack configuration mode. The ingress PDUs are conveyed from the plurality of NIMs 204, 204S to the switching controller 206 by means of one or more ingress data buses 205A. Similarly, the egress PDUs are transmitted from the switching controller 206 to the plurality of NIMs 204 via one or more egress data buses 205B.

The management module 220 generally comprises a policy manager 224 for retaining and implementing traffic policies. The policies implemented by the policy manager 224 are preferably based in part on Layer 2 and or Layer 3 addressing information derived from source learning operations, route information received from other routing devices, and filtering rules uploaded by the network administrator via a configuration manager 222 using, for example, simple network management protocol (SNMP) messages 226. The traffic policies derived from source learning, other network nodes, and the administrator are made available to a routing engine 231 and collectively represented by the forwarding table 254.

The configuration manager 222 may also be able to receive configuration information uploaded by the network administrator. This configuration information includes information that is used to determine whether the stack address of the ISS 120 is to be replaced with a new stack address. This information may be stored in a stack information module 230, which may also contain routing and switching tables for managing the ISS. This stack information module 230 enables the various stackable elements to communicate and work with each other within the stack environment.

In addition to the traffic policies, the management module 220 may further include a central management module (CMM) 210 for implementing the ISS stack switching functions discussed in more detail below. The CMM 210 in one embodiment may comprise a port state module 212 and a stack manager 214. The port state module 212 is adapted to monitor the operational state of the stack ports 202S using keep-alive signals, for example, and identify the presence of adjacent stackable elements coupled to the stack ports 202S.

The stack manager 214 may be is adapted to participate in the elections that determine the management responsibilities of each stack element, process supervision messages used to monitor the status of the other elements, and if necessary, serve as a primary master switch (PMS) or a secondary master switch (SMS) whose responsibilities may include assigning and propagating a stack address to one or more stackable elements 100-103, and updating switching and other tables used in the switching operations of the ISS. In addition, the stack manager 214 is adapted to determine the ISS stack element topology and process topology related messages exchanged between stackable elements of the ISS 120. In particular, the stack manager 214 transmits ISS topology requests and known ISS topology information to other stackable elements, and maintain one or more local topology tables. In one embodiment, the stack manager 214 is also responsible for detecting the loss of an element, insertion of an additional element (causing a trap to be generated), removal of an element from the stack, determining the operational state of the associated CMM 210. The stack manager 214 is also adapted to read its own local MAC address storage 218—generally assigned by the manufacture—and to receive the local MAC addresses of the other element elements within the ISS. The MAC address storage may preferably be embodied in a read-only memory module. Each stack element is operable to store a copy of the current topology of the stack and detect changes to the topology.

As alluded to previously, stack element 200 preferably comprises at least one network processor module 206 that is capable of, but not limited to, Layer 2 (Data Link) and Layer 3 (Network) switching operations as defined in the OSI reference model. The set of possible Layer 2 protocols for operably coupling the external ports 202 to a wired and/or wireless communication link may include the IEEE 802.3 and IEEE 802.11 standards, while the set of possible Layer 3 protocols may include Internet Protocol (IP) version 4 defined in Internet Engineering Task Force (IETF) Request for Comment (RFC) 791 and IP version 6 defined in IETF RFC 1883.

In addition to the routing engine functionality 231, the switching controller/processor module 206 may preferably comprise a queue manager 240. In one embodiment, the routing engine functionality 231 comprises a classifier 232 that receives ingress PDUs from the data bus 205A, inspects one or more fields of the PDUs, classifies the PDUs into one of a plurality of flows using a content addressable memory 233, and retrieves forwarding information from the forwarding table 254 retained in high-speed memory. The forwarding information retrieved from the forwarding table 254 preferably includes, but is not limited to, a flow identifier used to specify those forwarding operations necessary to prepare the particular PDU for egress, which may include the next-hop address and class of service (COS) or Quality of Service (QOS) provisions.

A forwarding processor 234 receives the ingress PDUs with the associated forwarding information and executes one or more forwarding operations prior to transmission to the appropriate egress port or ports. The forwarding operations preferably include but are not limited to header transformation for re-encapsulating data, VLAN tag pushing for appending one or more VLAN tags to a PDU, VLAN tag popping for removing one or more VLAN tags from a PDU, quality of service (QoS) for reserving network resources, billing and accounting for monitoring customer traffic, Multi-Protocol Label Switching (MPLS) management, authentication for selectively filtering PDUs, access control, higher-layer learning including Address Resolution Protocol (ARP) control, port mirroring for reproducing and redirecting PDUs for traffic analysis, source learning, class of service (CoS) for determining the relative priority with which PDUs are allocated switch resources, color marking used for policing and traffic shaping, and inter-stack switch labeling management used to efficiently distribute PDUs between elements 100-103 of the ISS 120, for example.

After the forwarding processor 234, the PDUs are passed to and stored in the queue manager 240 until bandwidth is available to transmit the PDUs to the appropriate egress port. In particular, the egress PDUs are buffered in one or more of a plurality of priority queues in the buffer 242 until they are transmitted by the scheduler 244 to an external port 202 via the output data bus 205B.

Figure 3:
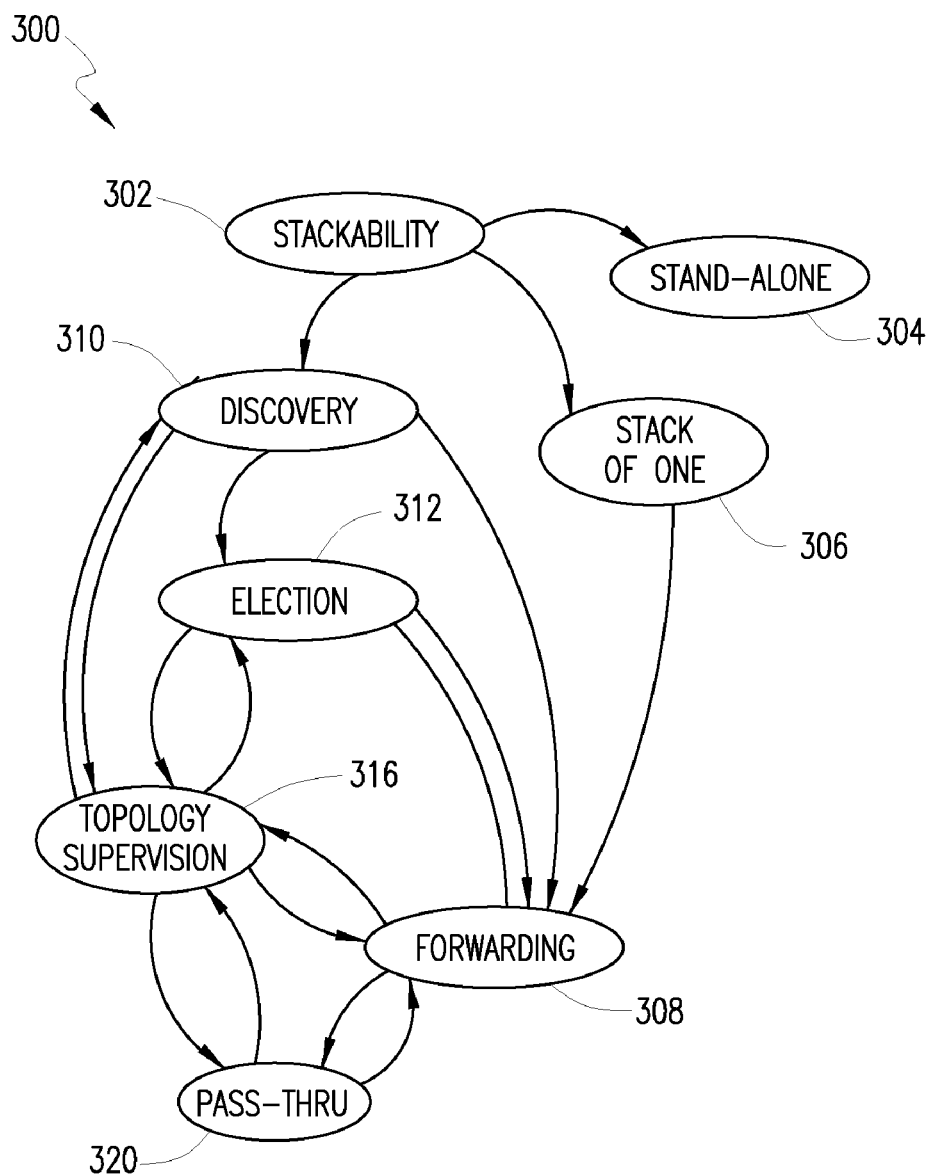
FIG. 3 is a state diagram representing the stages of a stack element during start up in accordance with one embodiment.

Referring now to FIG. 3, illustrated therein is a state diagram representing the stages of an automatic setup mechanism 300 employed by a stackable element of the ISS from boot-up to fully operational modes in accordance with one embodiment of the present disclosure. Upon initialization, a stack element (e.g., element 200 described in detail hereinabove) enters a stackability determination state 302 in which the element determines whether it is configured to serve as a stand-alone element or as an element in an ISS. The stackability is determined based on the physical and operational presence of stack ports 202S. If the switch is configured to serve as a stand-alone operation 304, the stack manager 214 is disabled and the switch operates in accordance with a multi-layer switch having all data ports 202.

When configured as a stackable element, however, the port state module 212 monitors the stack links and indicates to the stack manager 214 changes of any of the two stack links. The stack manager responds, for example, to link up, e.g., a link has been inserted, or link down, e.g., a link has been removed, and accordingly performs the appropriate actions, such as handling and processing the situation wherein one or multiple elements have joined the stack, or one or multiple elements have left the stack, and the like. The stack manager 214 monitors the stack ports for keep-alive messages or other signals indicating the presence of adjacent elements. In the absence of an adjacent stack element, the element determines that it is a stack of one state 306 and thereafter proceeds to a forwarding state 308 in which it receives and transmits data traffic on the standard data ports 202 while monitoring the stack ports 202S for the introduction of one or more additional stack elements.

If one or more elements are detected on the stack ports 202S while in the stackability determination state 302, the stackable element 200 proceeds to the discovery state 310 for purposes of determining the topology of the ISS 120. The stackable element 200 may then proceed to the election state 312 in which the stackable elements of the ISS 120 execute a role determination process used to identify which two of the elements are to serve as the primary master switch and secondary master switch, also referred to herein as the primary element and secondary element, respectively.

The determination criteria of which of the stack elements will serve as the primary and the secondary elements are known to those of ordinary skill in the art. Examples of such election criteria include, but are not limited to, electing the stackable element with the lowest MAC address 218 as the primary master, electing the stackable element with the longest running time or uptime as the primary master, electing the primary master and the secondary master based on the slot number assigned, and electing the primary master and the secondary master based on user preference stored in a configuration file.

The primary master is responsible for ISS management functions including handling of all command line interface input and synchronizing images, i.e., synchronizing different software versions on the stackable elements. This function may also include synchronizing various tables and information, e.g., switching tables, routing tables, and configuration information. The secondary master is the designated successor to the primary master and functions as the new primary master if the primary master fails or otherwise becomes non-operational. While each of the stackable elements of the preferred embodiment may assume the role of the primary and secondary masters, the non-elected stackable elements defer to the master elements until any one of them is later elected to serve as a master.

While operating in the forwarding state 308, the element 200 is adapted to transition into and back from a supervision state 316 and a pass-through (PT) state 320. In the supervision state 316, the element 200 transmits supervision messages to both its adjacent neighbors for supervisory purposes, analogous to a keep-alive mechanism for exchanging keep-alive messages when a new stack element is inserted into the ISS 120 or an existing element is removed, for example, the element 200 automatically exchanges topology information with other stackable elements and updates its stack element neighbor tables. If both the primary and secondary masters fail at the same time, the rest of stackable elements—which may most likely be in the forwarding state 308—proceed to election state 312 to elect a new primary master. If the secondary master fails, there is no election, but the primary master may choose or designate one of the idle elements to take the secondary role. Once this element is chosen, the primary master advertises the new assignment to the entire stack with an election indication message that is vested with maximum authority. If the primary master fails, there is no real election, but the secondary master promotes itself to become the new primary master and chooses one of the idle elements to become the new secondary master. Again, once this element is chosen, the new primary master advertises the new assignment to the entire stack as before.

In the pass-through (PT) state 320, the data ports 102 of the stack element are entirely disabled and routing engine 231 configured to pass data traffic from each of its two stack ports 202S to the opposite stack port. In the PT state 320, the routing engine 231 effectively emulates a fixed wire connection between the stack ports of the two adjacent stack elements, thus preventing what would otherwise be a break in the continuity of the system of stackable elements 120. The pass-through may be used to maintain continuity between the stackable elements adjacent to a common element instead of shutting down.

As illustrated, a stackable element may transition in either direction between the discovery state 310 and the supervision state 316 since supervision is required and is enforced as early as discovery state 310 when a stack element detects a neighbor and it should, therefore, execute supervisory tasks described in more detail below.

Figure 4:
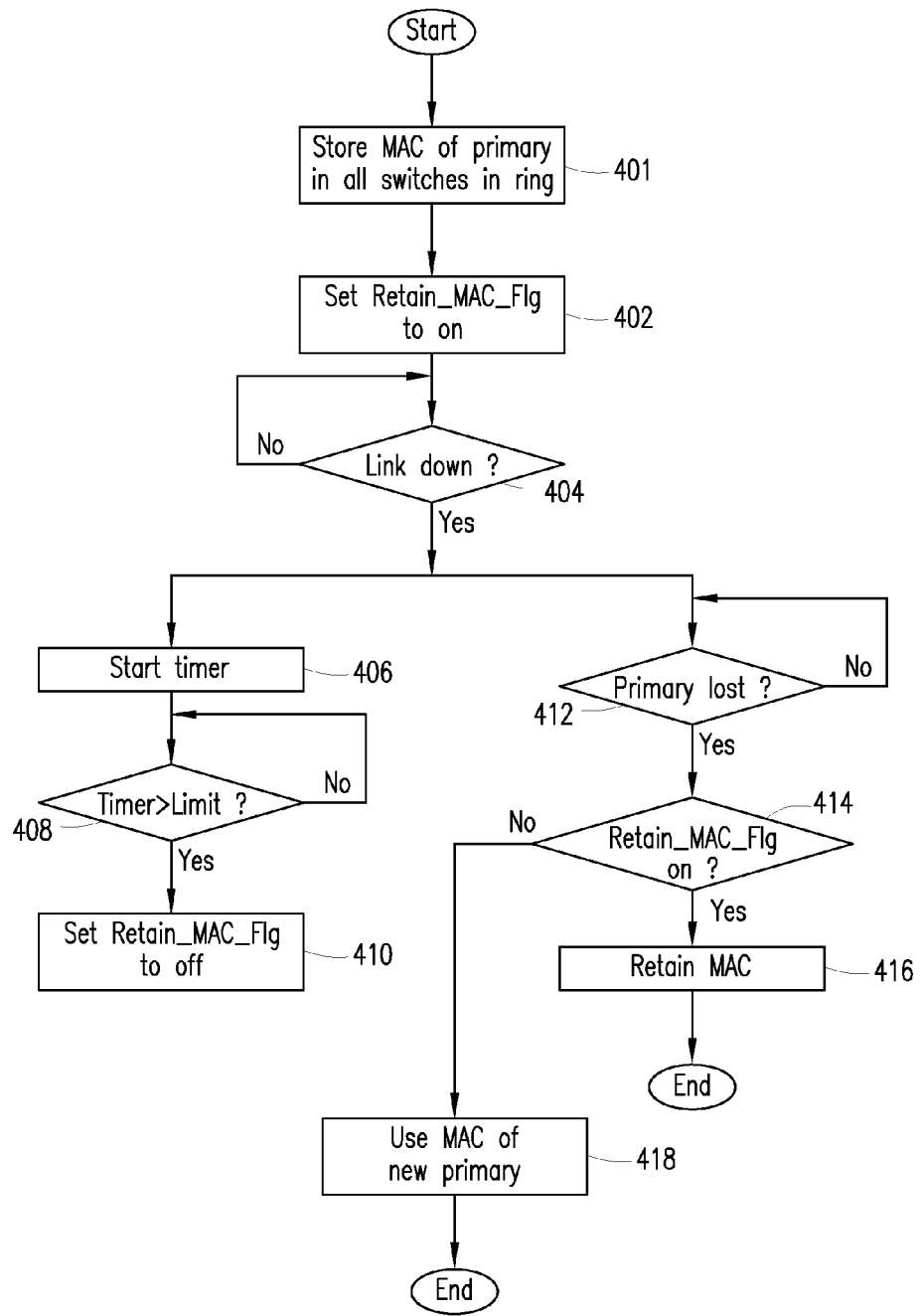
FIG. 4 shows a flowchart that illustrates MAC address management in accordance with one embodiment.

FIG. 4 is a high level flowchart showing a process by which the stack manager can determine, when contact with the primary master is assessed to be lost, whether or not to change the MAC address of the stack in accordance with one embodiment. At the time this procedure starts, a number of stack elements, such as elements 100-103, have been configured in a ring to form a virtual switch, such as ISS 120 shown in FIG. 1. The procedure of FIG. 4 may not be performed unless a ring is initially present in ISS 120 and the primary master and secondary master have been determined. Determination of a primary master and a secondary master has been alluded to previously and will not be covered in any further detail.

Initially, the MAC address of the elected primary stack element is stored in each of the stack elements or switches in ISS 120 as the stack MAC address (block 401). An indicator Retain_MAC_Flg is set to "on" (block 402). This indicator may be turned on when control messages between the stack elements establish that a ring is present. Normal processing of both the data traffic managed by ISS 120 and inter-stack communication necessary to maintain ISS 120 can then occur across ISS 120. Periodic inter-stack communications are used to verify connections between the stack elements and to determine that no links are down (block 404). As long as no link-down conditions are found, the process continues to loop and to monitor the stackable elements.

Once a link-down condition is found via usual system assessment, the stack manager starts two separate processes. These processes, which can run simultaneously or sequentially, are shown as two branches. In the first branch shown on the left side of this Figure, a timer is started (block 406) as a means of determining whether communication with a primary master is lost due to a "single" event, which may comprise events that are sufficiently close in time, or due to two separate events sufficiently spaced apart in time. If the loss is due to a single event, then stack elements on both sides of primary element 100, i.e., elements 101 and 103, may learn of the link-down condition at approximately the same time, although the amount of time necessary to detect the loss is dependent on the specific hardware and software in use. A time limit, which is stored in each stack element, is configured to provide an outside limit on "simultaneous" events. For example, some configurations of stackable elements can detect a failure within milliseconds, while other configurations can take several seconds. The value of the timer is repeatedly compared to the time limit to determine whether the timer has exceeded the time limit (block 408). When the timer exceeds the time limit, the Retain_MAC_Flg is set to "off" (block 410), indicating that the ring has been broken for a long enough period that a further link-down condition could not be part of the same event. As will be apparent, the magnitude of the time limit may be determined prior to use of the procedure in a specific configuration. This value can be permanently stored in the element or passed to the element during configuration. This timing branch of the procedure may end at this point, although the other branch of the procedure continues. The point in the second branch at which block 410 occurs may be dependent upon the type of event that caused the link-down condition.

Taking reference to right-hand branch of FIG. 4, a determination is made whether contact with the primary stack element, e.g., has been lost (block 412). If the primary element has been lost, the procedure moves to determine whether the Retain_MAC_Flg is on (block 414). If the time limit is set appropriately and the initial failure is a failure of the primary element, block 412 may be performed before the Retain_MAC_Flg is turned off. In contrast, if the initial link-down condition is caused by the failure of a link between two stack elements or by the failure of any stack element other than the primary element, communication with the primary element has not been lost, so the this process will loop and continue to perform block 412 periodically until a second failure occurs. When the loop associated with block 412 is executed for a longer period than the time limit, the Retain_MAC_Flg may be set to "off" during this looping period. Once communication with the primary element is lost, the Retain_MAC_Flg is checked to determine whether this feature is on (block 414). If the Retain_MAC_Flg is on, the MAC of the missing primary will be retained (block 416). If the Retain_MAC_Flg is off, the MAC of the new primary stack element may be used as the stack address (block 418).

Figure 5A:
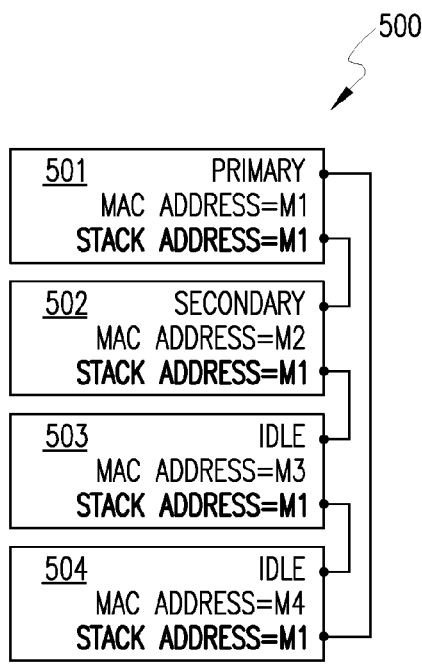
FIGS. 5A and 5B illustrate, respectively, an exemplary ISS system at initialization and after a single event that causes loss of communication with a primary stack element according to one embodiment.
Figure 5B:
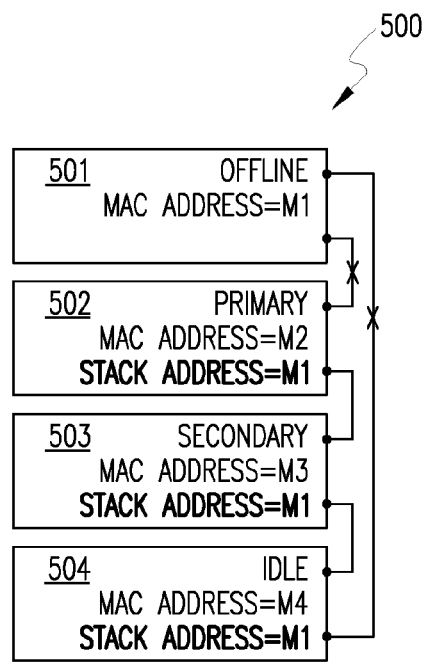

A first example of the procedure of FIG. 4 in operation is illustrated in FIGS. 5A and 5B. In FIG. 5A, ISS 500 is composed of four stack elements 501-504, having respective MAC addresses of M1-M4. Of these four stack elements, element 501 has been elected the primary stack element and element 502 has been elected the secondary stack element. M1 is used as the stack address for ISS 500. In FIG. 5B, primary stack element 501 has crashed and is now offline. This situation is characterized by the loss of communication between elements 501 and 502 and between elements 501 and 504. The loss of primary element 501 will be detected by the remaining elements at approximately the same time, i.e., within the time limit set in the stack elements. Accordingly, even though element 502 is the new primary element and element 503 is the new secondary element, the stack address remains M1, minimizing the disruption in processing.

Figure 6A:
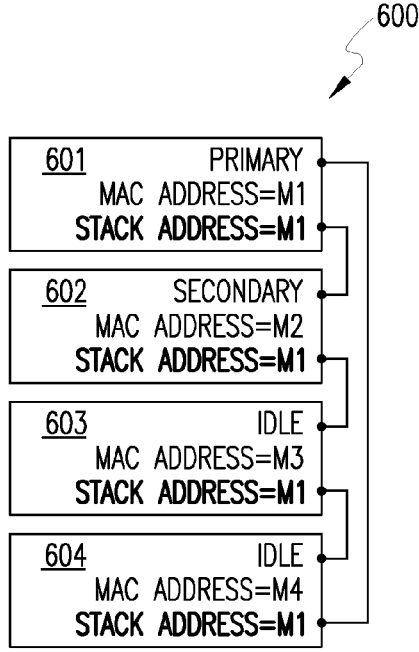
FIGS. 6A-6C illustrates, respectively, an exemplary ISS system at initialization, after a first link-down event, and after a second link-down event that is separated in time in accordance with one embodiment.
Figure 6B:
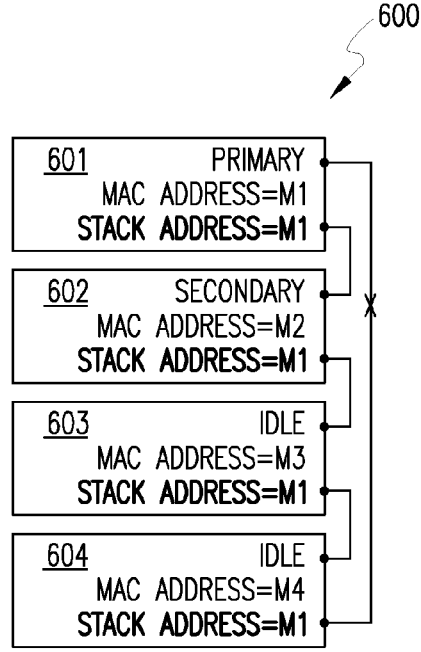
Figure 6C:
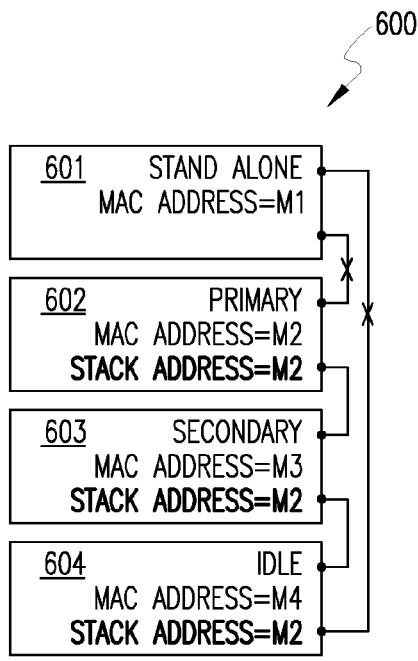

FIGS. 6A-6C illustrate another example of the procedure of FIG. 4 when the loss of the primary element involves two events. FIG. 6A illustrates ISS 600, composed of stack elements 601-604, with element 601 serving as primary element, element 602 serving as secondary element, and the stack address set to M1. FIG. 6B illustrates ISS 600 after the link between element 601 and element 604 fails. Although a ring no longer exists, all of the stack elements remain in communication with each other over the remaining active links, so the primary and secondary elements remain the same, as does the stack address. However, after this event occurs, once a preconfigured time limit is exceeded, Retain_MAC_Flg is set to off. Later, when the link between element 601 and element 602 fails, this event will be recognized as occurring separately, illustrated in FIG. 6C. Element 601 is out of communication with the other elements, but may continue to function as a stand-alone element using its own address, M1. Of the remaining elements, element 602 has now been chosen as the new primary element and element 602 designated as the new secondary element. Because the two events were separated in time, the remaining elements of ISS 600 use the MAC address of their new primary element, i.e., M2.

While the procedure described above adequately manages the illustrated examples, this procedure does not address an additional situation in which failure events cause the stack to be broken into two or more functioning subsets, each of which has two or more elements. When this situation occurs, the desirable result would be to have each subset functioning with its own separate MAC address, i.e., the subset that does not include the primary element would elect a new primary and use the MAC address of the new primary as its stack address.

Figure 7:
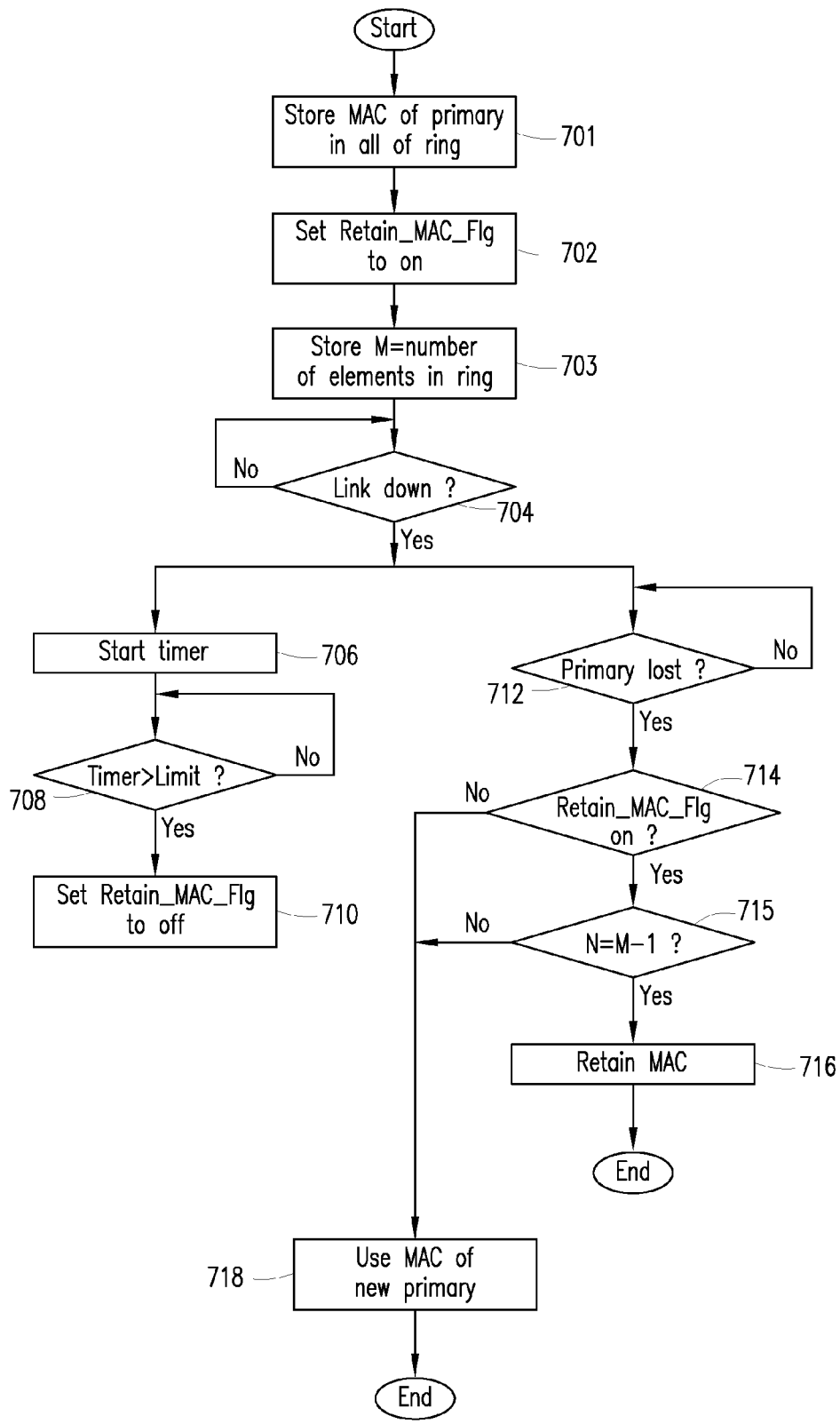
FIG. 7 shows a flowchart that illustrates MAC address management in accordance with another embodiment.

To accommodate this possible situation, an additional factor can be added to the procedure, as illustrated in FIG. 7.

Other than two new steps, the procedure of FIG. 7 is similar to the procedure of FIG. 4, with the same conditions applying for the use of this procedure, i.e., the stack elements are connected to form a ring and a primary element and a secondary element have been designated. The MAC address of the primary element is stored in each of the elements forming the ring (block 701) and the Retain_MAC_Flg is set to on (block 702). Additionally, a variable or parameter "M" may be used to designate the number of stack elements that are connected to form the ring. The value of M is stored in each of the elements of the ring (block 703). This number will be used later in the procedure to determine whether or not the primary element is the only element missing. The ring is monitored as before until a link-down condition is detected (block 704); until this condition occurs, the procedure loops in place.

Once a link-down condition is detected, the timer is started (block 706) and the timer is compared to the time limit (block 708) until the time limit is exceeded, at which time Retain_MAC_Flg is set to off (block 710). In the second branch of FIG. 7, an assessment is made whether communication with the primary element has been lost (block 712). As long as communication with the primary continues, the procedure loops in place, with Retain_MAC_Flg being set to off if the time limit is exceeded during the looping of the procedure. Once communication with the primary is lost, Retain_MAC_Flg is checked to determine whether this flag is on (block 714). If the flag is off, the time limit has been exceeded and the procedure recognizes that two separate events have happened, so the MAC of the new primary element is used for the subset of elements that are no longer in touch with the primary element (block 718). If the Retain_MAC_Flg is on, an additional determination is performed. The number of stack elements remaining in the subset that has lost communication with the primary element is determined and designated as N. N is then compared to M−1 (block 715). If N is not equal to M−1, i.e., if more than one element is missing from the stack, the procedure acknowledges that the primary element is likely to still be using its MAC address, so the procedure uses the MAC of the new primary as the stack MAC for this subset (block 718). This subset will retain the existing MAC address of the stack if the loss of contact with the primary element is a single event, i.e. Retain_MAC_Flg is on, and only the primary element is missing, i.e., N=M−1.

Using the procedure of FIG. 7, four exemplary scenarios can be identified in one implementation: (a) the primary alone is lost in a single event; (b) the primary alone is lost in two separate events; (c) the primary and at least one other stack element are lost in a single event; and (d) the primary and at least one other stack element are lost in two separate events. For scenarios (a) and (b), the procedure of FIG. 7 acts in the same manner as the procedure of FIG. 4 and provides the results shown in FIGS. 5A-5B and FIGS. 6A-6C described hereinabove. The examples of the procedure of FIG. 7 with respect to scenarios (c) and (d) will now be set forth below.

Figure 8A:
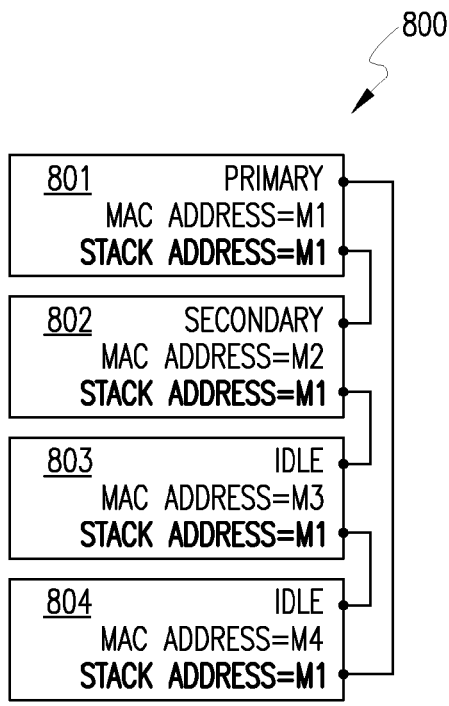
FIGS. 8A and 8B illustrate, respectively, an exemplary ISS system at initialization and after two separate link-down events that are closely related in time in accordance with another embodiment.
Figure 8B:
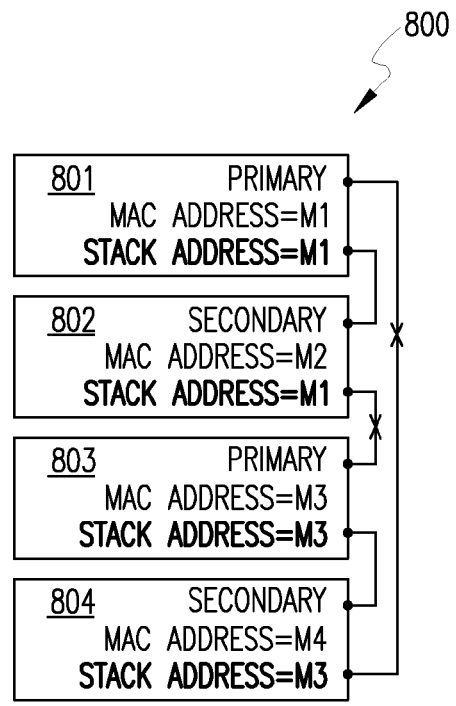

FIG. 8A illustrates ISS 800 composed of stack elements 801-804 connected to form a ring, with element 801 serving as primary element, element 802 serving as secondary element, and a stack address of M1. FIG. 8B illustrates ISS 800 after a single event caused both the link between element 801 and element 804 and the link between element 802 and 803 to fail, for example, by a technician removing both connectors at the same time. The loss of these two links has split ISS 800 into two smaller stacks: the first stack contains elements 801 and 802 and the second stack contains elements 803 and 804. Even though these two events may be "simultaneous", as least as far as the procedure can detect, by comparing the number of elements in the group that has lost contact with the primary element, e.g., 803 and 804, to M−1, the procedure of FIG. 7 recognizes that communication with more than the primary element has been lost. The probability is high that the primary element is continuing to use its own MAC address; accordingly, elements 803 and 804 together may elect a new primary M3 and use the MAC address of the new primary as the stack address for these two elements.

Figure 9A:
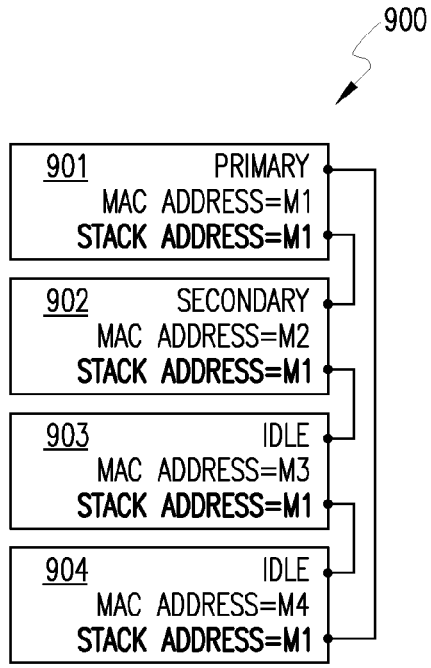
FIGS. 9A-9C illustrate, respectively, an exemplary ISS system at initialization, after a first link-down event, and after a second link-down event that is separated in time in accordance with another embodiment.
Figure 9B:
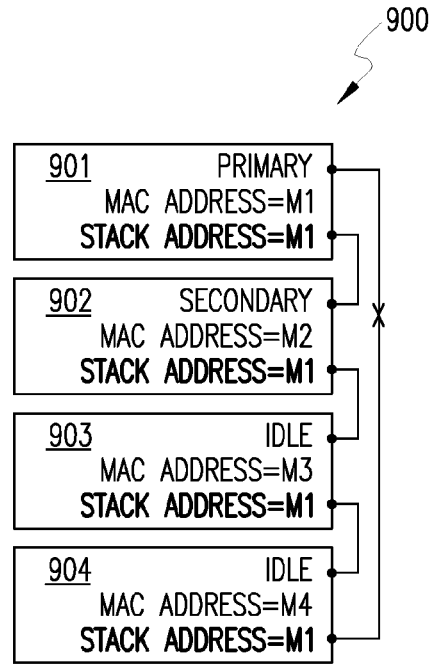
Figure 9C:
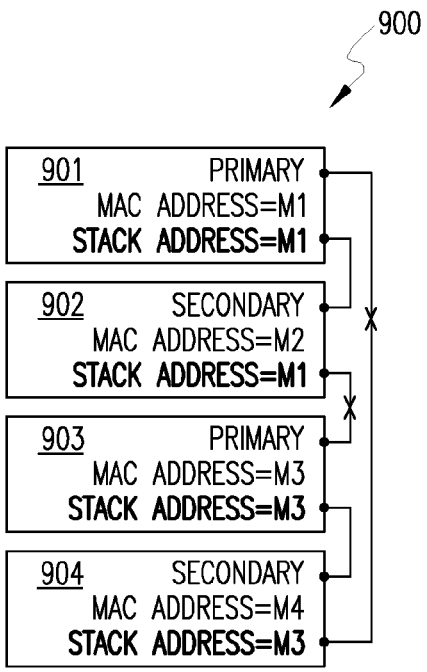

FIGS. 9A-9C illustrate, respectively, an exemplary ISS system at initialization, after a first link-down event, and after a second link-down event that is separated in time in accordance with another embodiment.

When a primary element is separated from all the rest of the ring in an apparently single event, e.g. within the time limit, the remaining members of the stack may continue to use the original MAC address. To avoid duplicate MAC addresses, as a further variation, the isolated, formerly primary element may be configured to release its own base MAC address and take a new, pre-determined MAC address that has been configured by the user. Accordingly, based on the foregoing, a high-level scheme for avoiding MAC address duplication in a stack may involve the following: storing a first Media Access Control (MAC) address is stored in each stack element of the ring; and responsive to an assessment that communication with a primary stack element is lost, determining whether to replace the first MAC address with a second MAC address or to retain the first MAC address in each stack element remaining of the set of stack elements, based on the assessments set forth hereinabove. The determination process may be based at least in part on whether a time elapsed between a first event and a second event is greater than a predetermined time limit, wherein the first event operates to severe communication on a first side of the primary stack element and the second event operates to severe communication on a second side of the primary stack element.

It will be realized that service logic operable to effectuate the foregoing operations and determinations may be accomplished via a number of means, including software (e.g., program code), firmware, hardware, or in any combination, usually in association with a processing system associated with the stack elements. Where the processes are embodied in software, such software may comprise program instructions that form a computer program product, instructions on a computer-readable medium, uploadable service application software, or software downloadable from a remote station, and the like.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method operable in a ring network including a plurality of stack elements, the method comprising:
associating a first Media Access Control (MAC) stack address with each of the plurality of stack elements in the ring, wherein the first MAC stack address is a MAC address of a first primary stack element of the plurality of stack elements in the ring;
determining a first failure in the ring;
determining a second failure in the ring wherein communication is lost with the first primary stack element and responsive thereto, electing a new primary stack element from the plurality of the stack elements;

in response to determining that a time between the first failure and the second failure is greater than a predetermined amount of time, associating a new MAC stack address to each of the plurality of the stack elements, wherein the new MAC stack address is the MAC address of the new primary stack element; and in response to determining that a time between the first failure and the second failure is less than the predetermined amount of time, retaining the first MAC stack address as a stack address associated with the new primary stack element and the plurality of stack elements.

2. The method of claim 1 wherein the first failure in the ring is a failure of a link with the primary stack element on a first side in the ring and the second failure is a failure of a link with the primary stack element on a second side of the ring.

3. The method of claim 1 further comprising:
storing a variable M in each of the plurality of stack elements, wherein M corresponds to a number of the plurality of stack elements in the ring.

4. The method of claim 3, wherein in response to determining that a time between the first failure and the second failure is less than a predetermined amount of time, retaining the first MAC stack address as a stack address associated with the new primary stack element and the plurality of stack elements, comprises:
determining a number N of the plurality of stack elements in communication with the new primary stack element;
when the number N is equal to M−1 and the time between the first failure and the second failure is less than a predetermined amount of time, retaining the first MAC stack address as a stack address associated with the new primary stack element and the plurality of stack elements.

5. The method of claim 4, further comprising:
when the number N is less than M−1 and the time between the first failure and the second failure is less than a predetermined amount of time, associating the new MAC stack address to each of the plurality of the stack elements, wherein the new MAC stack address is the MAC address of the new primary stack element.

6. The method of claim 1 further comprising:
configuring the predetermined amount of time; and
electing the first primary stack element from the plurality of stack elements.

7. The method of claim 6, further comprising:
in response to determining the first failure in the ring, initiating a timer; and
setting a flag to indicate replacement of the first MAC stack address when a time between the first failure and the second failure is greater than a predetermined amount of time.

8. A stack element operable in a ring of a plurality of stack elements, comprising:
at least one processing entity operable to:
associate a first Media Access Control (MAC) address as a stack address, wherein the first MAC address is a MAC address of a first primary stack element of the plurality of stack elements in the ring;
detect a first failure in the ring;
detect a second failure in the ring wherein communication is lost with the first primary stack element and responsive thereto, elect a new primary stack element from the plurality of the stack elements;
in response to a time between the first failure and the second failure being greater than a predetermined amount of time, associate a new MAC address as the stack address, wherein the new MAC address is the MAC address of the new primary stack element; and
in response a time between the first failure and the second failure being less than the predetermined amount of time, retain the first MAC stack address as the stack address.

9. The stack element of claim 8 wherein the first failure in the ring is a failure of a link with the primary stack element on a first side in the ring and the second failure is a failure of a link with the primary stack element on a second side of the ring.

10. The stack element of claim 8 wherein the at least one processing entity is further operable to:
store a variable M, wherein M corresponds to a number of the plurality of stack elements in the ring.

11. The stack element of claim 10, wherein the at least one processing entity is further operable to:
determining a number N of the plurality of stack elements in communication with the new primary stack element;
in response to a time between the first failure and the second failure being less than the predetermined amount of time and the number N is equal to M−1, retain the first MAC stack address as the stack address.

12. The stack element of claim 11, further comprising:
in response to a time between the first failure and the second failure being less than the predetermined amount of time and the number N is less than M−1, associate a new MAC address as the stack address, wherein the new MAC address is the MAC address of the new primary stack element.

13. The stack element of claim 8 wherein the at least one processing entity is further operable to:
configure the predetermined amount of time; and
elect the first primary stack element from the plurality of stack elements.

14. The stack element of claim 13, wherein the at least one processing entity is further operable to:
in response to detecting the first failure in the ring, initiate a timer; and
set a flag to indicate replacement of the first MAC stack address when a time between the first failure and the second failure is greater than a predetermined amount of time.

15. A stack element operable in a ring of a plurality of stack elements, comprising:
at least one processing entity operable to:
store a first Media Access Control (MAC) address as a stack address for the stack element, wherein the first MAC address is a MAC address of a first primary stack element of the plurality of stack elements in the ring;
detect a first failure in the ring and initiate a timer;
detect a second failure in the ring;
in response to a time between the first failure and the second failure being greater than a predetermined amount of time, set a flag to indicate replacement of the first MAC stack address;
determine whether communication is lost with the first primary stack element in response to the first and second failure in the ring;
when the flag is set to indicate replacement of the first MAC stack address and communication is lost with the first primary stack element, associate a new MAC address as the stack address, wherein the new MAC address is the MAC address of a new primary stack element; and when the flag is not set to indicate replacement of the first MAC stack address and communication is lost with the first primary stack element, retain the first MAC stack address as the stack address.

16. The stack element of claim 15 wherein the at least one processing entity is further operable to:
store a variable M, wherein M corresponds to a number of the plurality of stack elements in the ring.

17. The stack element of claim 16, wherein the at least one processing entity is further operable to:
determine a number N of the plurality of stack elements in communication with the new primary stack element;
when the flag is not set to indicate replacement of the first MAC stack address and the number N is equal to M−1, retain the first MAC stack address as the stack address.

18. The stack element of claim 17, further comprising:
when the flag is not set to indicate replacement of the first MAC stack address and the number N is less than M−1, associate a new MAC address as the stack address, wherein the new MAC address is the MAC address of the new primary stack element.

19. The stack element of claim 18 wherein the at least one processing entity is further operable to:
store a second MAC address as a MAC address for the stack element.

20. The stack element of claim 19 wherein
the new primary stack element is the stack element and the new MAC address for the stack address is the second MAC address for the stack element.

* * * * *